(12) United States Patent
Thomson et al.

(10) Patent No.: US 10,914,656 B2
(45) Date of Patent: Feb. 9, 2021

(54) CONDITION MONITORING

(71) Applicant: Aktiebolaget SKF, Gothenburg (SE)

(72) Inventors: Allan Thomson, Lanark (GB); Verena Slawik, Königsberg in Bayern (DE)

(73) Assignee: Aktiebolaget SKF, Gothenburg (SE)

( * ) Notice: Subject to any disclaimer, the term of this patent is extended or adjusted under 35 U.S.C. 154(b) by 488 days.

(21) Appl. No.: 15/942,608

(22) Filed: Apr. 2, 2018

(65) Prior Publication Data

US 2019/0301973 A1 Oct. 3, 2019

(51) Int. Cl.
*G01M 13/028* (2019.01)
*G01M 13/045* (2019.01)
*G01H 1/00* (2006.01)

(52) U.S. Cl.
CPC .......... *G01M 13/028* (2013.01); *G01H 1/003* (2013.01); *G01M 13/045* (2013.01)

(58) Field of Classification Search
CPC .. G01M 13/028; G01M 13/045; G01H 1/003; G01H 13/00
USPC .................................. 73/593, 587, 659, 660
See application file for complete search history.

(56) References Cited

U.S. PATENT DOCUMENTS

| | | | | |
|---|---|---|---|---|
| 4,408,294 A * | 10/1983 | Imam | ..................... | G01H 1/006 702/35 |
| 4,912,661 A * | 3/1990 | Potter | ....................... | G01P 3/44 702/147 |
| 5,811,683 A * | 9/1998 | Yoshioka | ............ | G01M 13/045 324/207.25 |
| 7,317,994 B2 * | 1/2008 | Iyer | ....................... | G01M 15/12 340/680 |
| 8,810,173 B2 * | 8/2014 | Li | ....................... | H02P 29/0241 318/400.12 |
| 2018/0074089 A1 * | 3/2018 | Kestering | ............... | F03D 17/00 |

* cited by examiner

*Primary Examiner* — Lisa M Caputo
*Assistant Examiner* — Rose M Miller
(74) *Attorney, Agent, or Firm* — Garcia-Zamor Intellectual Property Law; Ruy Garcia-Zamor; Bryan Peckjian

(57) ABSTRACT

Condition monitoring of equipment, machines, and parts with rotational or linear movement that constantly changes speed, starts and stops at different positions, that does not make complete rotations is done according to the invention by binning vibrational data according to position and thereafter performing a Fourier transformation for analysis. Among other things this avoids smearing in the frequency domain due to speed changes.

10 Claims, 2 Drawing Sheets

CONDITION MONITORING

TECHNOLOGICAL FIELD

The invention concerns condition monitoring of rotating equipment such as rolling element bearings, gears and shafts and is more particularly directed to rotating equipment having different partial rotations.

BACKGROUND

Condition monitoring of rotating equipment/machines such as shafts, roller and plain bearings, and gears, is commonly done with one or more sensors measuring one or more physical parameters and transduce these physical parameters into electrical signals, which then can be processed to try and determine the condition of the equipment/machine as a whole and/or of the individual parts. The one or more physical parameters usually comprises temperature and vibrations. Temperature will in conjunction with the current mode of the machine be able to give an indication of the state of it. The different modes can for example be off directly after a shut-down, off after the machine has had time to cool down, startup phase, at operating temperature etc., each mode having an acceptable temperature range and if the temperature is outside the corresponding temperature range, then, for example, an irregularity warning can be issued. Other common sensors are different types of vibration sensors, such as accelerometer sensors and acoustic emission sensors. In the context of this application, vibration sensors can be any one of, but not restricted to, accelerometer sensors, acoustic emission sensors, displacement sensors, and surface profile sensors, all generating vibration signals. Traditionally vibration measurements are used to find cyclic events by for example signal processing in the form of filtering and enveloping and then going from the time domain to the frequency domain by a Fourier transformation. Great effort is usually put into measuring these vibrations when the machine/equipment is rotating at a fairly constant speed to avoid any smearing in the frequency domain. How do we process vibration signals from equipment/machines that constantly changes rotational speed, which does not have complete rotations like a pendulum swinging back and forth, and maybe worst of all equipment/machines that have irregular movement such as first a few full rotations forward, then a half turn back, then a quarter turn forward and so on. There is still room for improvements.

SUMMARY

An object of the invention is to define a condition monitoring method and device that can handle equipment/machines/parts with rotational or linear movement that constantly changes speed, starts and stops at different positions, that does not make complete rotations etc.

FFT spectrum analysis methods used in condition monitoring are usually applied to data from rotating equipment that keep rotating in the same direction at a constant or near constant speed. On machines/shafts that only do partial rotations back and forth, thus with different angles of movement and through continuously changing speeds, will produce a lot of spectral smearing as defect event repetitions are not evenly spaced in time.

The aforementioned object is achieved by binning vibration data (raw or already Enveloped) samples into angular bins being a small fraction of a degree (determined by the application), extracting a statistical parameter for each bin containing more than one vibration data, applying a filter, defining new start and end of acquisition (clear null bins) and reconstructing a new waveform in a rotations (or degrees) domain. Repetitive events are now evenly spaced and show up well in an FFT spectrum.

The aforementioned object is also achieved by a condition monitoring method and device by binning vibrational data according to position and thereafter performing a Fourier transformation for analysis.

The aforementioned object is also achieved according to the invention by a method of condition monitoring a machine part by means of measuring vibrations by means of a vibration sensor during a relative movement between the vibration sensor and the machine part being monitored. According to the invention the method further comprises measuring, correlating, binning, Fourier transforming, analyzing and determining. Measuring involves measuring relative positions of the machine part in relation to a position of the vibration sensor by means of a position sensor during the relative movement. Correlating involves correlating the relative positions of the machine part with samples of the measured vibrations. Binning involves binning the position correlated samples into bins according to each sample's correlated position. Fourier transforming involves Fourier transforming content of the bins in relation to position. Analyzing involves analyzing the Fourier transformed content as to condition of the machine part. Finally the determining involves determining a condition of the machine part based on the analysis of the Fourier transformed content.

The relative movement between the vibration sensor and the machine part can either be rotational or linear. If the movement is rotational then the relative positions are suitably angular.

In some versions the method further comprises enveloping the samples of the measured vibrations before binning. Suitably the method can further comprise preprocessing content of the bins before the Fourier transformation of the content of the bins.

The different additional enhancements of the method of condition monitoring a machine part according to the invention can be combined in any desired manner as long as no conflicting features are combined.

The aforementioned object is also achieved according to the invention by a condition monitoring device to monitor the condition of a machine part. The device comprises a vibration sensor arranged to measure vibrations during a relative movement between the vibration sensor and the machine part. According to the invention the device further comprises a position sensor, a correlator, a binning unit, a signal processor, an analyzer and a determining unit. The position sensor is arranged to measure relative positions of the machine part in relation to a position of the vibration sensor during the relative movement. The correlator is arranged to correlate the relative positions of the machine part with samples of the measured vibrations. The binning unit is arranged to bin the position correlated samples into bins according to each sample's correlated position. The signal processor is arranged to Fourier transform content of the bins in relation to position. The analyzer is arranged to analyze the Fourier transformed content as to condition of the machine part. The determining unit is arranged to determine a condition of the machine part based on the analysis of the Fourier transformed content.

The relative movement between the vibration sensor and the machine part is either rotational or linear. If the movement is rotational then the relative positions are suitably angular.

In some embodiments the device further comprises an enveloping unit arranged to envelop the samples of the measured vibrations before the binning unit bins. Suitably the device further comprises a pre-processor arranged to pre-process content of the bins before the signal processor Fourier transforms the content of the bins.

The different additional enhancements of the condition monitoring device according to the invention can be combined in any desired manner as long as no conflicting features are combined.

Other advantages of this invention will become apparent from the detailed description.

BRIEF DESCRIPTION OF THE DRAWINGS

The invention will now be described in more detail for explanatory, and in no sense limiting, purposes, with reference to the following figures, in which.

DETAILED DESCRIPTION

In order to clarify the method and device according to the invention, some examples of its use will now be described in connection with FIGS. 1 to 3.

Figure 1:
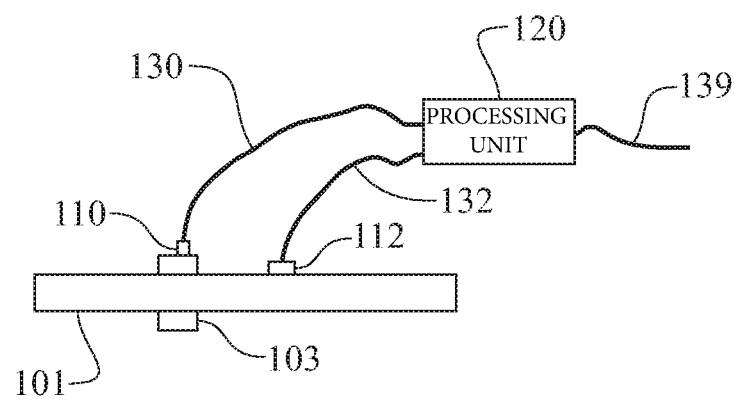
FIG. 1 illustrates a schematic diagram of the invention in use.

FIG. 1 illustrates a schematic diagram of the invention in use on a shaft 101 or axle. In this example the illustrated shaft 101 is a rotating shaft, in other embodiments it can for example be a linearly moving shaft. The rotation might be different partial rotations back and forth, with different angles of movement through continuously changing speeds. The shaft 101 has in this example an attached bearing 103 as the subject of the condition monitoring. The bearing 103 can be a roller element bearing or a plain bearing. The bearing 103 comprises an inner ring rotating with the shaft 101 and an outer ring. The bearing 103 has a vibration sensor 110 attached to its outer ring, such as an accelerometer or acoustic emission sensor, that will transduce vibrations of the bearing 103 to vibration signals. The vibration signals are then transferred to a processing unit 120 by a connection 130 that is either wired or wireless. There is also a position sensor 112, suitably an absolute position sensor, that transduces a relative or absolute position of the subject of the condition monitoring or a part of it, the inner ring of the bearing 103 in this case, and a predetermined position, suitably the position of the vibration sensor 110 on the outer ring, into position signals. Since this is a rotating shaft, it is suitable that the position signals are angular. The position sensor can for example be a 3 to 6 axis accelerometer/gyro, such as a MEMS type, especially suitable for, for example, large size bearings, such as wind turbine bearings. The position signals are transferred to the processing unit 120 by a connection 132 that is either wired or wireless.

The processing unit 120 is illustrated as being physically apart from the vibration 110 and position 112 sensors, but can also be physically and functionally wholly or in part at the sensors. The processing unit 120 comprises preprocessing of the vibration and position signals, such as for example frequency filtering. If the vibration and position signals are not in the digital domain, an analogue to digital conversion will take place. Further preprocessing might include enveloping and decimation, all in dependence on the application. In the digital domain each vibration signal sample will be correlated with a position derived from the position signals. If the vibration signals and the position signals are not synchronously sampled, there will have to be some signal processing such that each vibration sample can be correlated with a position at that time. Depending on the situation, there might for example be necessary to resample and/or interpolate. With each vibration sample being provided with an angular position, each sample is binned into angular bins. The size of the bins can be a small fraction of a degree and will depend on the desired resolution. As a rule, the bins are suitably ten times smaller than the highest number of events per degree that is desired to be able to detect. So if it is desired to be able to detect three events per degree, then each bin should be one thirtieth of a degree or less. The binned vibration data can be either raw data or preprocessed and for example already be enveloped. Statistical parameters are suitably extracted from each bin with multiple vibration data. Statistical parameters are for example, but not limited to, Max, MM, Mean, Median, Crest-Factor, Skewness, MM-Max (peak to peak), RMS, and other desired ones depending on the further signal processing.

It is most likely that some bins are empty, without any vibration data at all, if there is only partial rotation. These empty bins are discarded on either side of the bins that are not empty, suitably to a point where the number of bins remaining are 2N, where N is an integer (212=4096 bins) to make an FFT working better. An FFT, or another digital/discrete Fourier transformation, is done to get cycles per location unit, in this case angle. Ordinarily we go from a time domain to a frequency domain. An analysis is suitably done and then the results can be communicated to a network and further processing units via a further connection 139, which can be completely wired, completely wireless or a combination of wired and wireless.

Figure 2:
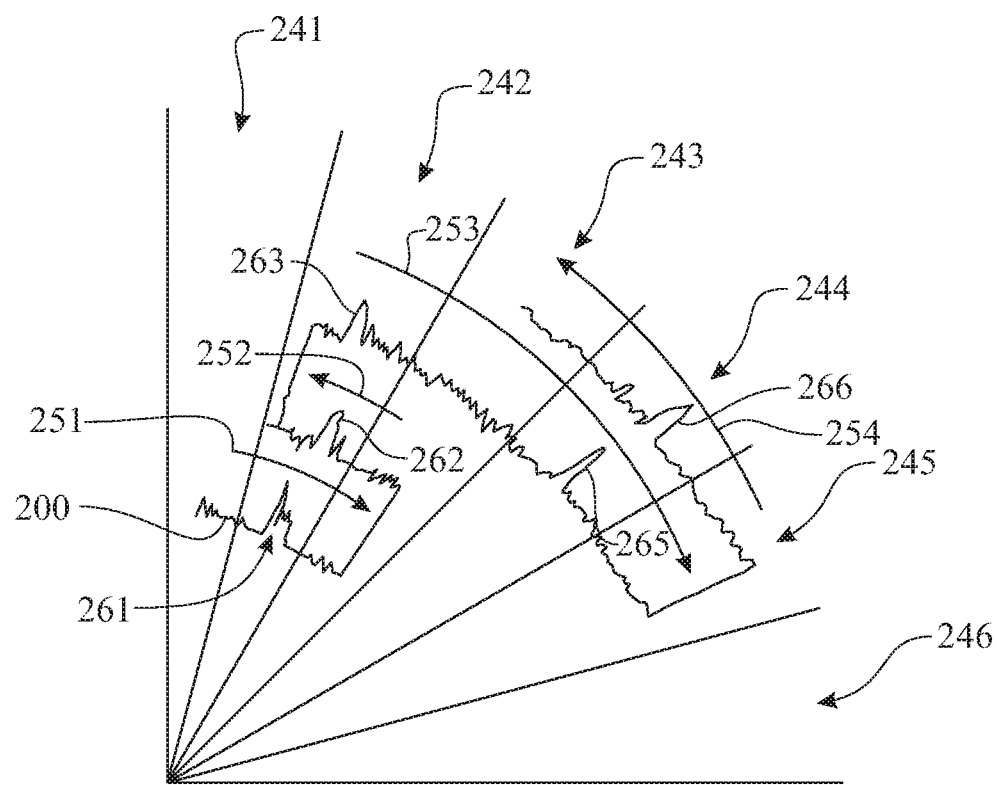
FIG. 2 illustrates binning according to the invention.

FIG. 2 illustrates binning, angular binning in this example, according to the invention. In this example, only a 90 degree sector is shown. In many applications this is enough if rotation is limited to 90 degrees. There are a total of six angular bins 241, 242, 243, 244, 245, 246, each representing a 15 degree sector. A vibration sensor signal 200 from a vibration sensor is classified according to position data of each sample to go into one of the bins. The movements 251, 252, 253, 254 of for example a shaft and inner ring according to FIG. 1, are a bit random. As can be seen there are a number of peaks 261, 262, 263 in the second bin 242 and two peaks 265, 266 in the fourth bin 244. This could indicate that there is something within the angular location within the second 242 and fourth 244 bins. The sixth bin is completely empty and will not be included in the FFT. If the vibration signal 200 enters a bin more than once, then suitably some sort of statistical processing is done to get a data set of single values in the bins. There can of course be created additional data sets with different statistical processing done, in dependence on the further signal processing and analysis. Statistical processing can for example be, but not restricted to, Max, MM, Mean, Median, Crest-Factor, Skewness, MM-Max (peak to peak), RMS, and other desired ones depending on the further signal processing. If Mean is chosen then all the vibration data in a bin is added and then divided by the number of times the vibration signal entered that bin.

Figure 3:
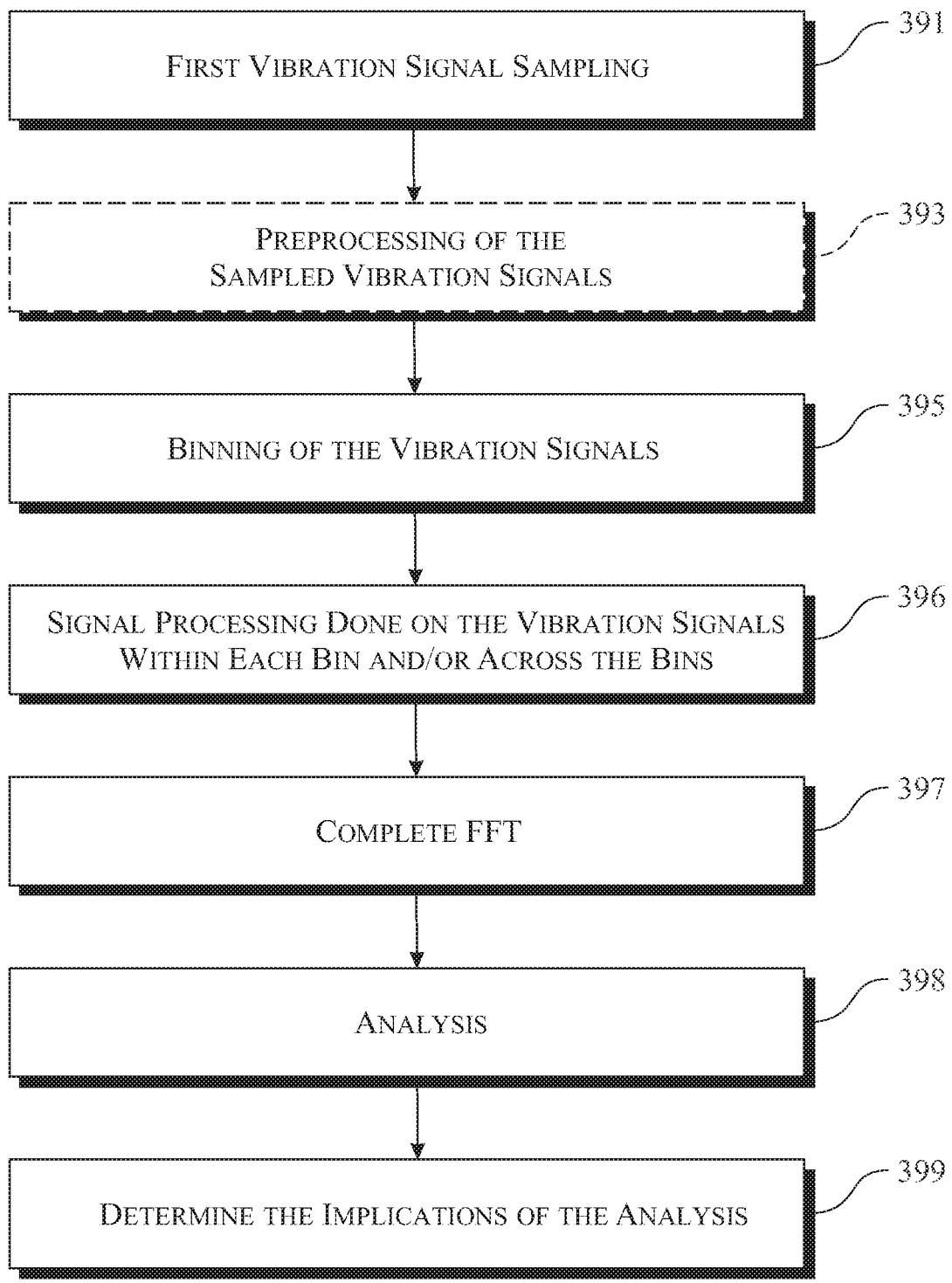
FIG. 3 illustrates schematically a signal processing flow according to the invention.

FIG. 3 illustrates schematically a signal processing flow according to the invention. There is first vibration signal sampling 391 together with a position signal. This can be done continuously or for just a predetermined time at predetermined, random or otherwise triggered intervals. Optionally there can be some preprocessing 393 of the sampled vibration signals. This can be in the form of filtering, enveloping and/or decimation. Thereafter, there is binning 395 of the vibration signals in dependence of the corresponding position signals. There is then signal processing 396 done on the vibration signals within each bin and/or across the bins. Signal processing within each bin can for example be data reduction, determining what the vibration data of a bin is if there are more than one vibration data set in a bin. Signal processing across all the bins can for example be filtering, rectification, enveloping etc. Thereafter an FFT 397 is done and thereafter an analysis 398 to thereby be able to determine 399 the implications of the analysis and communicate this to one or more users and/or to a database/further processing.

The invention is not restricted to the above-described embodiments, but may be varied within the scope of the following claims.

FIG. 1 illustrates a schematic diagram of the invention in use:

101 Shaft or axle, illustrated as a rotational shaft, but can also be a linear shaft,

103 Bearing, roller element or plain, or gear,

110 Vibration sensor, such as an accelerometer or acoustic emission sensor, transducing vibrations to vibration signals,

112 Position sensor, suitably an absolute position sensor, generating position signals,

120 Processing unit, for signal processing and correlation of vibration signals and position signals,

130 Connection between vibration sensor and processing unit, illustrated as wired but can advantageously be wireless,

132 Connection between position sensor and processing unit, illustrated as wired but can advantageously be wireless,

139 Connection for communication with network/further processing unit(s), can be completely wired, completely wireless or a combination of wired and wireless.

FIG. 2 illustrates binning according to the invention:

200 Vibration sensor signal from a vibration sensor,

241 First bin representing a first position range or relative distance range between the position sensor or a another position and a predetermined position on a movable/rotatable shaft,

242 Second bin representing a second position range or relative distance range between the position sensor or a another position and a predetermined position on the movable/rotatable shaft,

243 Third bin representing a third position range or relative distance range between the position sensor or a another position and a predetermined position on the movable/rotatable shaft,

244 Fourth bin representing a fourth position range or relative distance range between the position sensor or a another position and a predetermined position on the movable/rotatable shaft,

245 Fifth bin representing a fifth position range or relative distance range between the position sensor or a another position and a predetermined position on the movable/rotatable shaft,

246 Sixth bin representing a sixth position range or relative distance range between the position sensor or a another position and a predetermined position on the movable/rotatable shaft,

251 First relative movement, in a clockwise direction, through the first, second and third bin,

252 Second relative movement, in a counter-clockwise direction, through the third and second bins,

253 Third relative movement, in a clockwise direction, through the second, third, fourth and fifth bins,

254 Fourth movement, in a counter-clockwise direction, through the fifth, fourth and third bins,

261 Vibration peak in the second bin during the first relative movement,

262 Vibration peak in the second bin during the second relative movement,

263 Vibration peak in the second bin during the third relative movement,

265 Vibration peak in the fourth bin during the third relative movement,

266 Vibration peak in the fourth bin during the fourth relative movement.

FIG. 3 illustrates schematically a signal processing flow according to the invention:

391 Vibration signal sampling,

393 Optional preprocessing, such as enveloping and/or decimation,

395 Binning, by correlating the vibration signal and the position signal,

396 Signal processing within each bin and/or across the bins,

397 Fourier transform, such as FFT or another,

398 Analysis of the result of the FFT, frequency per location,

399 Determination of the implications of the analysis and communication of this to one or more users and/or to database/further processing.

What is claimed is:

1. A method of condition monitoring a machine part by means of measuring vibrations by means of a vibration sensor during a relative movement between the vibration sensor and the machine part being monitored, the method further comprises:
    measuring relative positions of the machine part in relation to a position of the vibration sensor by means of a position sensor during the relative movement,
    correlating the relative positions of the machine part with samples of the measured vibrations,
    binning the position correlated samples into bins according to each sample's correlated position,
    Fourier transforming content of the bins in relation to position,
    analyzing the Fourier transformed content as to condition of the machine part,
    determining a condition of the machine part based on the analysis of the Fourier transformed content.

2. The method of condition monitoring according to claim 1, characterized in that the relative movement between the vibration sensor and the machine part is rotational.

3. The method of condition monitoring according to claim 1, wherein the relative movement between the vibration sensor and the machine part is linear.

4. The method of condition monitoring according to claim 1, wherein the method further comprises enveloping the samples of the measured vibrations before binning.

5. The method of condition monitoring according to claim 1, wherein the method further comprises preprocessing content of the bins before the Fourier transformation of the content of the bins.

6. A condition monitoring device to monitor the condition of a machine part, the device comprising:

a vibration sensor arranged to measure vibrations during a relative movement between the vibration sensor and the machine part, wherein the device further comprises:

a position sensor arranged to measure relative positions of the machine part in relation to a position of the vibration sensor during the relative movement, a correlator arranged to correlate the relative positions of the machine part with samples of the measured vibrations, a binning unit arranged to bin the position correlated samples into bins according to each sample's correlated position, a signal processor arranged to Fourier transform content of the bins in relation to position, an analyzer arranged to analyze the Fourier transformed content as to condition of the machine part, a determining unit arranged to determine a condition of the machine part based on the analysis of the Fourier transformed content.

7. The condition monitoring device according to claim 6, wherein the relative movement between the vibration sensor and the machine part is rotational.

8. The condition monitoring device according to claim 6, wherein the relative movement between the vibration sensor and the machine part is linear.

9. The condition monitoring device according to claim 6, wherein the device further comprises an enveloping unit arranged to envelop the samples of the measured vibrations before the binning unit bins.

10. The condition monitoring device according to any claim 6, wherein the device further comprises a pre-processor arranged to pre-process content of the bins before the signal processor Fourier transforms the content of the bins.

* * * * *